United States Patent
Brauner

(10) Patent No.: US 7,144,128 B2
(45) Date of Patent: Dec. 5, 2006

(54) ILLUMINATED FISHERMAN'S NIPPER

(75) Inventor: Bill Brauner, Los Altos, CA (US)

(73) Assignee: Steamworks, LLC, Palo Alto, CA (US)

( * ) Notice: Subject to any disclaimer, the term of this patent is extended or adjusted under 35 U.S.C. 154(b) by 141 days.

(21) Appl. No.: 10/932,915

(22) Filed: Sep. 2, 2004

(65) Prior Publication Data

US 2005/0115075 A1    Jun. 2, 2005

Related U.S. Application Data

(60) Provisional application No. 60/499,578, filed on Sep. 2, 2003.

(51) Int. Cl.
*F21V 33/00* (2006.01)

(52) U.S. Cl. .............. 362/119; 362/120; 362/253; 362/109; 43/53.5; 43/17.5

(58) Field of Classification Search ............. 362/119, 362/120, 253, 109, 190, 191; 43/53.5, 17.5, 43/4

See application file for complete search history.

(56) References Cited

U.S. PATENT DOCUMENTS

| | | | |
|---|---|---|---|
| 2,279,068 A | 4/1942 | Siebrandt | |
| 2,854,564 A * | 9/1958 | Cohen et al. | 362/119 |
| 3,316,634 A | 5/1967 | Bliss | |
| 3,330,025 A | 7/1967 | Williams | |
| 3,825,961 A | 7/1974 | Klein | |
| 4,796,372 A | 1/1989 | Klein | |
| 4,918,775 A * | 4/1990 | Leu | 7/168 |
| 5,136,744 A | 8/1992 | Allsop et al. | |
| 5,400,451 A | 3/1995 | Furukawa | |
| 5,412,896 A | 5/1995 | Morgan | |
| 5,557,874 A | 9/1996 | Pietrandrea | |
| 5,568,698 A | 10/1996 | Harding et al. | |
| 5,683,171 A * | 11/1997 | Van Gennep | 362/191 |
| 5,916,277 A | 6/1999 | Dallas | |
| 6,045,234 A | 4/2000 | Leeds | |
| 6,296,365 B1 * | 10/2001 | McCalla et al. | 362/119 |
| 6,988,814 B1 * | 1/2006 | Correa | 362/109 |
| 2002/0017048 A1 * | 2/2002 | Lam | 43/4 |

* cited by examiner

*Primary Examiner*—Thomas M. Sember
(74) *Attorney, Agent, or Firm*—Pitts & Brittian, P.C.

(57) ABSTRACT

A device for use by fishermen to perform several functions including assisting in preparing a hook on a fishing line. The device includes a housing carrying a nipper for assisting in cutting a fishing line. A light is carried within the housing and directed toward the nipper for illuminating the fishing line when fishing in the dark. A threading device receptacle is provided for receiving a threading device, as well as a magnet receptacle for holding metallic objects such as a hook. Further, the nipper of the present invention is provided with means for securing the nipper to a selected object for easy location.

12 Claims, 4 Drawing Sheets

ILLUMINATED FISHERMAN'S NIPPER

CROSS-REFERENCE TO RELATED APPLICATIONS

This application claims the benefit of U.S. Provisional Application No. 60/499,578, filed Sep. 2, 2003.

STATEMENT REGARDING FEDERALLY SPONSORED RESEARCH OR DEVELOPMENT

Not Applicable

BACKGROUND OF THE INVENTION

1. Field of Invention

The present invention pertains to the field of fishing. More particularly, this invention is related to a nipper used by fishermen for several functions including assisting in preparing a hook on a fishing line, the nipper having among other features a light for illuminating the fishing line.

2. Description of the Related Art

In the sport of fishing, it is well known that many different tools are used. A fisherman might have at his disposal tools for threading a line through the eye of a hook, tools to assist in tying a knot, tools for repairing a fly, tools to assist in removing a hook from a fish, or tools for keeping, weighing and cleaning fish. There are also now many electronic devices for assisting fishermen in locating and sizing fish in order to determine the proper location to cast and the proper equipment to use to catch fish. As a result of the many tools available, it is known that maintaining, storing and organizing the tools so that they are readily available can become challenging.

It is well known in the sport of fishing that many fishermen enjoy the sport in the morning, prior to dawn. It is known that conditions for catching fish can be more conducive at these times. However, because the sun has not risen, fishermen must be equipped with flashlights or some other source of light in order to see their equipment as they perform various tasks such as tying and/or baiting hooks. However, it is also known that having certain light sources can counteract the benefits of fishing in the pre-dawn.

As briefly discussed, there are many tools available specifically for fishermen. Included in such tools are tools to assist in tying a line onto a hook. Other similar tools are provided for crimping a split sinker onto a line, or conversely, to remove the sinker from the line. A variety of the tools available are provided for serving more then one function so as to minimize the total number of individual tools required. Other tools, while not provided for the sport of fishing, are provided with a structure and function similar to those tools used for fishing. Typical of the art are those devices disclosed in the following U.S. Patents:

| Pat. No. | Inventor(s) | Issue Date |
| --- | --- | --- |
| 2,279,068 | J. R. Siebrandt | Apr. 7, 1942 |
| 3,316,634 | H. N. Bliss | May 2, 1967 |
| 3,330,025 | V. B. Williams | Jul. 11, 1967 |
| 3,825,961 | G. B. Klein | Jul. 30, 1974 |
| 4,796,372 | G. R. Klein | Jan. 10, 1989 |
| 5,136,744 | J. I. Allsop et al. | Aug. 11, 1992 |
| 5,400,451 | S. Furukawa | Mar. 28, 1995 |
| 5,412,896 | J G. Morgan | May 9, 1995 |
| 5,557,874 | S. J. Pietrandrea | Sep. 24, 1996 |
| 5,568,698 | R. W. Harding et al. | Oct. 29, 1996 |
| 5,916,277 | E. A. Dallas | Jun. 29, 1999 |
| 6,045,234 | T. J. Leeds | Apr. 4, 2000 |

Of these patents, the '068 device disclosed by Siebrandt is a wire crimping and twisting tool used in surgical operations to secure a wire about a bone fracture. The '068 device includes a pair of arms integrally formed with a curved end portion. The free ends of the arms converge toward each other and terminate in wire crimping jaws. The wire crimping jaws define cooperating V-shaped teeth which, when moved together with a wire there between, serve to crimp the wire. The end of one free arm defines a pair of through openings for receiving the two free ends of the wire being twisted. A cam lever is provided for moving the two arms toward each other in a locking fashion once the wire has been inserted into the through openings and between the wire crimping jaws, thereby allowing the device to be manipulated to twist the wire without requiring the user to apply a force to maintain the wire therein.

The '634 device disclosed by Bliss is similar to a conventional nail clipper, and further includes several implements received within a housing defined by a top wall portion and a bottom wall portion. These implements include various configurations of blades for cutting or sanding. A reamer is carried on the outside of the housing for cleaning a pipe bowl. A slot is formed in the distal end of an operating lever to engage the reamer when each is in a closed orientation.

Williams, in his '025 patent, discloses a device for applying a slip sinker to a fishing line. The '025 device includes a pair of pivotally connected arms. Each arm defines an anvil member projecting toward the anvil member of the other arm such that the two anvil members cooperate when the arms are pivoted toward each other. A flexible wire mandrel is provided to extend beside the anvil members. To apply a slip sinker on a fishing line, the fishing line is inserted in the slot of a split sinker. The flexible wire mandrel is then inserted into the slot and the sinker is positioned between the anvil members. The arms are then pivoted toward each other such that the anvil members engage and close the sinker around the fishing line and the wire mandrel. The wire mandrel is then removed whereby the sinker is slidably received about the fishing line. A knife element is defined by one arm and is provided for enlarging the slot in the sinker to allow receipt of the wire mandrel.

In the '961 patent, Klein teaches a fisherman's tool having an elongated handle including parallel cantilevered members similar to a conventional nail clipper. A lever is provided for flexing the cantilevered members together. Various blades are pivotally received between the cantilevered members, in similar fashion to the '634 device described briefly above. The cantilevered members are configured to define cutting blades on one side to cut a fishing line, crushing blades on an opposing side, and tweezers on the end for gripping and for crimping a split shot sinker. The lever defines a wedge for opening a sinker, as well.

In his '372 patent, Klein teaches a multi-purpose fly fishing implement for preparing artificial flies and associated leaders. The device is configured to be approximately equal in size to a conventional pen and is adapted to be carried in the pocket of a garment worn by a fisherman. The implement includes several interconnected, separable segments which perform different functions. Specifically, the implement is provided for applying a fly-treatment fluid onto an artificial fly, for straightening a leader, and for removing the shine from a leader. A holding clip is provided for holding the device in a garment pocket when the segments are connected together. The holding clip carries a leader cutting device for cutting fishing line.

Allsop et al., in their '744 patent, disclose a multi-purpose fishing tool to aid in the cutting of line and the maintenance of fish hooks and flies. The fishing tool comprises two normally spaced-apart hand grips that are attached to a common flexure assembly. A knife blade is mounted to one of the hand grips and is oriented and directed to abut an anvil surface on the other hand grip. One of the hand grips contains a storage compartment that is normally enclosed by an outer cover of the hand grip. The second hand grip contains a file that can be extended through an opening in the butt end of the hand grip for the actuation of a lever normally seated in a slot in the base of the hand grip. A pin for cleaning the eyelet of flies and hooks is mounted to the frame of the tool.

In the '451 patent issued to Furukawa, a knife is disclosed as storing a fly-tying vice easily capable of securing a hook. The fly-tying vice includes two arms having their respective mouth pieces at one end for clamping a hook, and a main screw for bringing the two arms closer to each other and for allowing the mouth pieces to clamp the hook. A hackle-plyer includes a wrench hole engaged with the top end of the main screw for turning the main screw for tightening. The main screw is turned lightly by hand to clamp the hook by the mouth pieces. The wrench hole is then fit into the top end of the main screw and turned in order to firmly secure the fly.

Morgan ('896) discloses a utility device for a fisherman including a housing worn on the fisherman by way of a neck strap. The housing includes a downwardly and forwardly directed light source and a magnifying glass for viewing a line of sight in the direction of the beam of light generated by the light source. The device also includes a clock facing upwardly toward the user, a measuring tape, a hone, a belt clip, a line cutter and a measuring tape. The housing is fabricated from a buoyant material such that the utility device will float if inadvertently dropped in water. The light source, clock, measuring tape, hone and line cutter are all of modular design such that each is individually removable from the housing for repair or replacement.

Pietrandrea et al., in their '874 patent, disclose a modified hemostat adapted to be used as multi-purpose fishing tool. The multipurpose fishing tool defines a gripping section, a fulcrum, handles and a knot-maker carried by one of the handles. The handles are adapted to compress and open split-shot and to cut fishing line. The knot-maker is designed to facilitate tying knots which are specifically required for fly-fishing. The knot-maker includes a ramp, channel, and extendable head having eyelet evacuators.

Harding et al., in their '698 patent, disclose a multipurpose fishing tool resembling a pair of bent long nosed pliers having plier ends for gripping a hook. Handle sections include guards for protecting the fingers of the user. A flashlight is carried by one of the handle sections and is oriented such that a beam of light is aimed at the plier ends. A tape measure receiving recess is provided on one of the handle ends to measure the length of a fish held by an immobilizer defined between the free ends of the handle sections.

In the '277 patent issued to Dallas, a multi-function tool including a caddy and a cover pivotally connected to the caddy is disclosed. The tool includes a primary implement attached to a first end of the caddy, and a plurality of secondary implements pivotally attached about a second end of the caddy. The secondary implements may be held in an extended position by a locking mechanism. The cover in one embodiment includes a light directed toward the second end of the tool.

Finally, Leeds, in his '234 patent, discloses a fishing tool including a housing and a probe assembly. A plunger is retractably mounted on the housing and includes a clip mounted thereon to assist in removing hooks from a fish. A battery compartment includes a cover removably mounted to the bottom face of the housing. Mounted to a center of the rear face of the housing is an incandescent lamp associated with a fiber optic line extending through the plunger and terminating at a lower face of the end of the plunger. Another light is mounted on an inboard end of the fiber optic line within the housing and is accessed via a cover on the rear face of the housing.

BRIEF SUMMARY OF THE INVENTION

The present invention is a device for use by fishermen to perform several functions including assisting in preparing a hook on a fishing line. The device of the present invention is a nipper provided primarily for assisting in cutting a fishing line. The nipper is provided with a light for illuminating the fishing line when fishing in the dark, a receptacle for receiving a threading device, and a magnet for holding metallic objects such as a hook. Further, the nipper of the present invention is provided with means for securing the nipper to a selected object for easy location.

The nipper includes a housing which carries at least a pair of cutting blades and an illumination device. The illumination device is disposed within the housing such that a beam of light generated by the illumination device is directed between the cutting edges of the blades. The housing defines a receptacle for receiving selected items such as a threading device and a magnet.

The housing includes a lower housing member, an upper housing member, and a retainer for retaining the lower and upper housing members together. The lower housing member defines a proximal end and a distal end, the distal end forming a lower jaw and being adapted to carry a first cutting blade. Similarly, the upper housing member defies a proximal end and a distal end, the distal end forming an upper jaw and being adapted to carry a second cutting blade. The retainer is a collar configured to encompass the proximal end the lower housing member and a portion of the proximal end of the upper housing members. Each of the lower and upper housing members is fabricated from a material that is semi-rigid such that each may be flexed toward each other in order to bring the first and second cutting blades together in cooperating fashion, and such that when force applied to the lower and upper housing members is released, each returns to its original configuration. To assist the user in pressing the lower and upper housing members toward each other, the distal end of each of the lower and upper housing members defines a gripping surface defined by a series of relieved areas.

The distal end of each of the first and second cutting blades defines a cutting edge configured to cooperate with the cutting edge of the other cutting blade. The cutting edges are configured such that contact between the cutting edges is clearly visible to the user. This is accomplished by configuring the distal end of each of the cutting blades to define a taper or curve from the distal end of the respective lower and upper housing members to the respective cutting edges.

An illumination device such as a flashlight is received between the lower and upper housing members such that a beam of light generated thereby is directed toward the cutting blades. The flashlight defines a proximal end and a distal end and is operated by rotating the distal end relative to the proximal end in order to turn the flashlight ON and OFF. The housing and flashlight barrel are keyed such that the barrel and distal end of the flashlight are fixed with respect to the housing. The proximal end of each of the lower and upper housing members is configured to cooperatively define an opening through which the proximal end of the flashlight is received. The proximal end of the flashlight is thus engaged and manipulated in order to selectively turn the flashlight ON and OFF. The housing further defines an illumination device receptacle for receiving the distal end of the illumination device in such a manner as to prevent the illumination device from interfering with the function of the first and second cutting blades.

The housing defines at least one receptacle for receiving selected items therein without interfering with the ergonomic features of the nipper. The upper housing member defines a threading device receptacle and a magnet receptacle. The threading device receptacle is provide for receiving a threading device comprising a handle portion and a threading wire, the threading wire forming a loop terminating at both ends on the handle portion. The threading device receptacle is defined by a recess in the upper surface of the upper housing member. The recess defines a bottom wall and opposing side walls adapted to receive the handle portion of the threading device therein, and below the upper surface of the upper housing member, thereby not interfering with the ergonomic contours of the nipper housing. An opening is defined by the upper housing member between the recess bottom wall and the upper surface of the upper housing member. The opening is provided for receiving the threading wire of the threading device. The upper housing member defines a cavity within for receiving the threading wire without interference such that receipt of the threading wire does not cause harm to the threading wire.

The magnet receptacle is provided for closely receiving a flat magnet. The magnet is provided for temporarily carrying metallic objects such as a fish hook. The magnet receptacle is recessed between the side walls of the housing such that the area in which the magnet is operable is limited, thereby limiting the space in which the metallic items are held. Further, the proximal end of the housing defines an opening through which the magnet is accessible such that elongated objects such as fish hooks may be temporarily carried by the magnet and extend through the proximal end of the housing. This configuration allows easy placement and removal of objects on and from the magnet.

A conventional securement device is provided for securing the nipper of the present invention to a selected object such as a key ring. In one embodiment, a link is carried by the proximal end of the barrel of the flashlight. In an alternate embodiment, the securement device is carried by the housing at a selected location. The securement device allows the user to secure the nipper of the present invention to a key chain, a tackle box handle, an article of clothing, or the like, thereby reducing the risk of losing the nipper.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
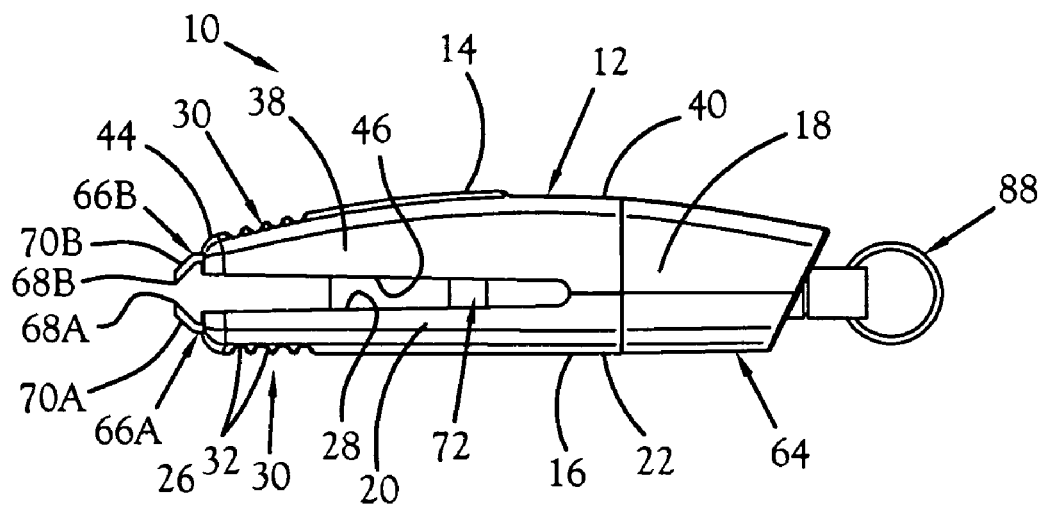
FIG. 1 is a side elevation view of the illuminated fisherman's nipper of the present invention.
Figure 2:
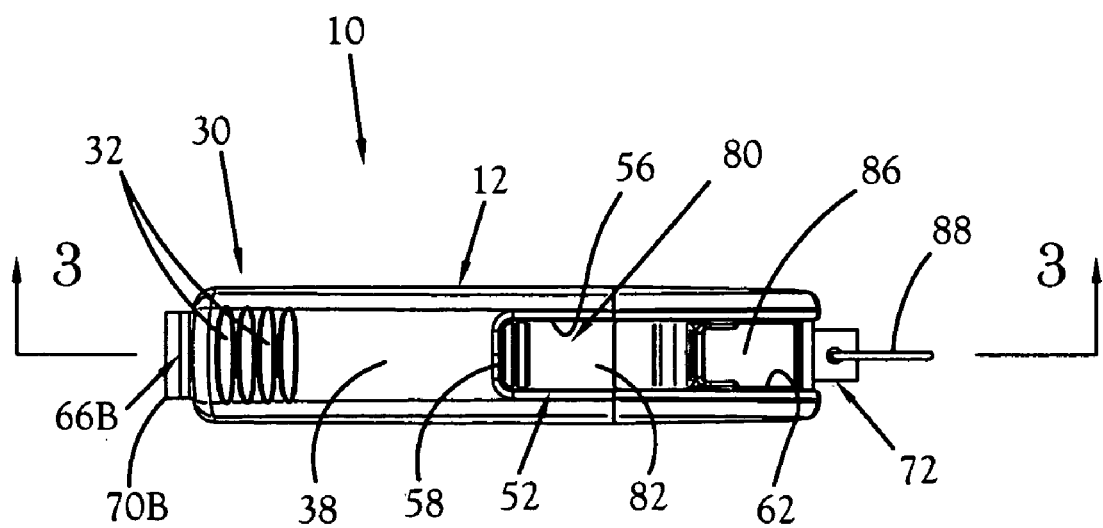
FIG. 2 is a top elevation view of the illuminated fisherman's nipper of FIG. 1.
Figure 3:
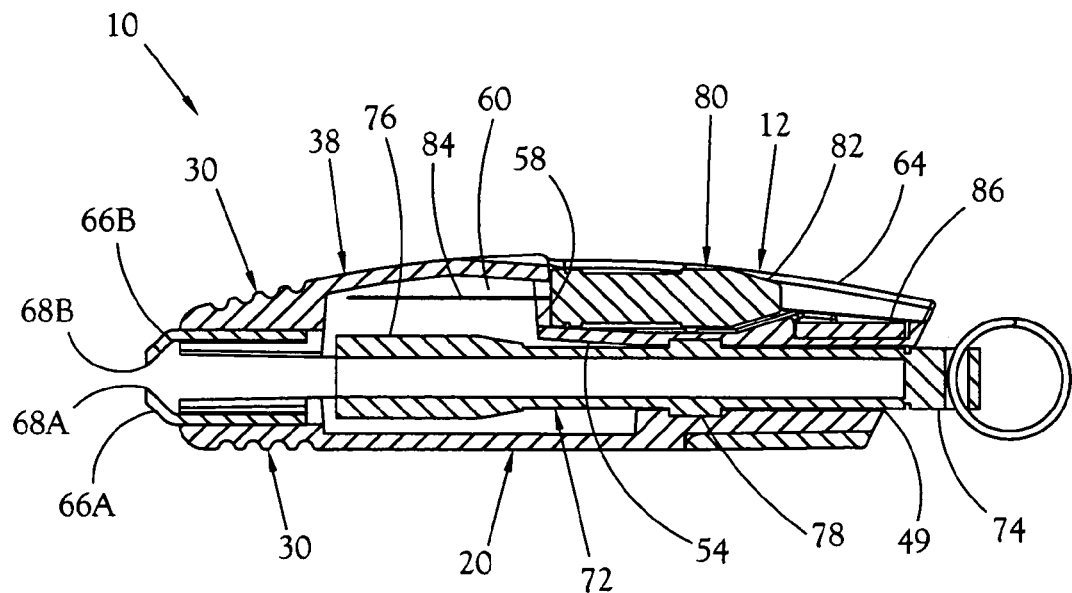
FIG. 3 is a side elevation view of the illuminated fisherman's nipper, in section taken along 3—3 of FIG. 2.

A device for use by fishermen to perform several functions including assisting in preparing a hook on a fishing line is disclosed. The device of the present invention is a nipper and is illustrated generally at 10 in the figures. The nipper 10 is provided primarily for assisting in cutting a fishing line. The nipper 10 further provides other features including a light 72 for illuminating the fishing line when fishing in the dark, a receptacle 52 for receiving a threading device 80, and a magnet 86 for holding metallic objects such as a hook.

Figures 4, 5:
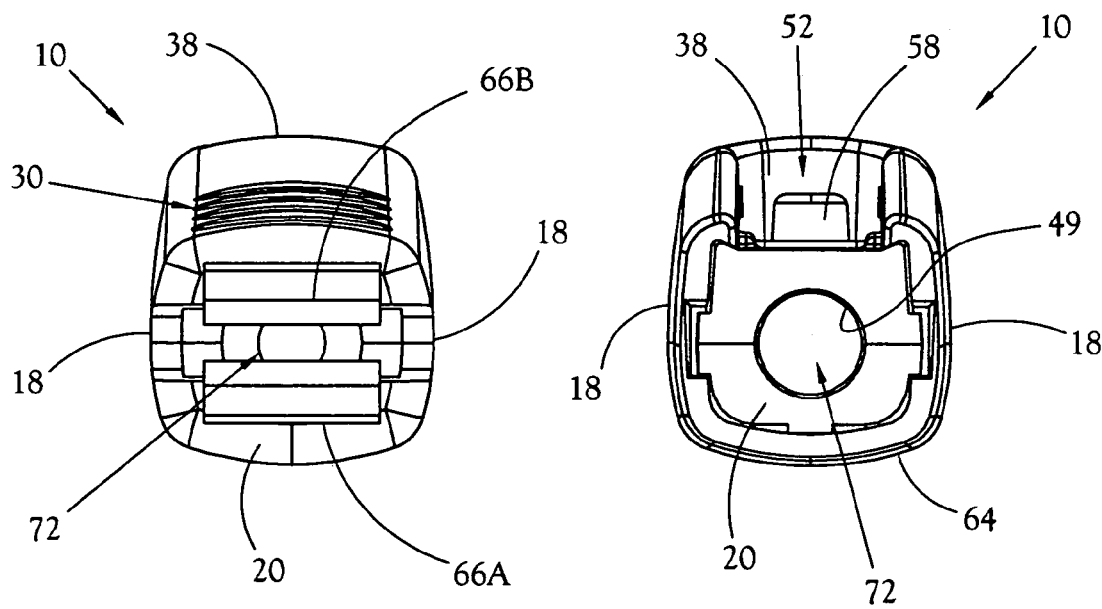
FIG. 4 is an end view of the distal end of the illuminated fisherman's nipper of FIG. 1 showing the illumination device oriented such as to direct light toward and between the cutting blades.
FIG. 5 is an view of the proximal end of the illuminated fisherman's nipper of the present invention illustrating the collar retaining the proximal ends of the lower and upper housing members.

As illustrated in FIG. 1, the nipper 10 includes a housing 12 which carries at least a pair of cutting blades 66A,66B and an illumination device 72. The illumination device 72 is disposed within the housing 12 such that a beam of light generated by the illumination device 72 is directed between the cutting edges 68A,68B of the nipper 10. This feature is most clearly illustrated in FIG. 4. The housing 12 defines at least one receptacle 52 for receiving selected items such as the illustrated threading device 80. Further, in the illustrated embodiment, the housing 12 defines a magnet receptor 62 for receiving the magnet 86.

Figure 6:
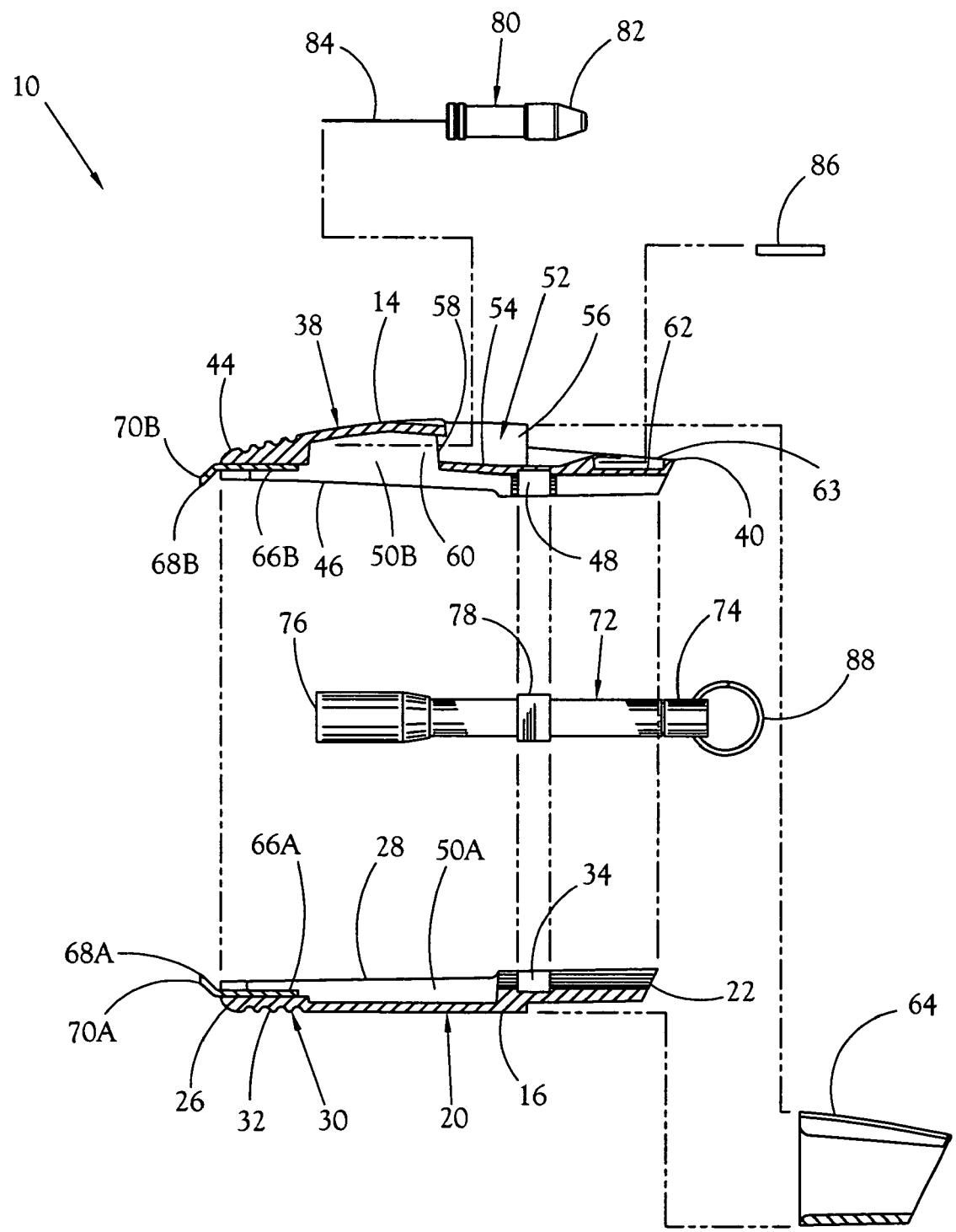
FIG. 6 is an exploded side elevation view, shown partially in section taken along 3—3 of FIG. 2 of the illuminated fisherman's nipper of the present invention.

The housing 12, as better illustrated in FIG. 6, includes a lower housing member 20, an upper housing member 38, and a retainer 64 for retaining the lower and upper housing members 20,38 together. The lower housing member 20 defines a proximal end 22 and a distal end 26, the distal end 26 forming a lower jaw 28 and being adapted to carry a first cutting blade 66A. Similarly, the upper housing member 38 defines a proximal end 40 and a distal end 44, the distal end 44 forming an upper jaw 46 and being adapted to carry a second cutting blade 66B. In the illustrated embodiment, the retainer 64 is a collar configured to encompass at least a portion of the proximal end 22,40 of each of the lower and upper housing members 20,38. Each of the lower and upper housing members 20,38 is fabricated from a material that is semi-rigid such that each may be flexed toward each other in order to bring the first and second cutting blades 66A,66B together in cooperating fashion, and such that when force applied to the lower and upper housing members 20,38 is released, each returns to its original configuration.

In the illustrated embodiment, the housing 12 is ergonomically configured in order to comfortably fit within the hand of a user. To this extent, the housing 12 defines a curved upper surface 14 adapted to mimic the inner arc formed by the thumb while performing a cutting operation with the nipper 10. The housing 12 defines a substantially planar bottom surface 16 which provides a foundation for the fingers to stabilize the nipper 10 during use. The upper and lower surfaces 14,16 of the nipper 10 cooperate to help the user orient the nipper 10 solely by tactile response. The housing 12 further defines first and second side surfaces 18 (see FIGS. 4 and 5) which define a curve in order to enhance the ergonomic properties of the nipper 10. While the housing 12 has been illustrated and described with particular ergonomic adaptations, it will be understood by those skilled in the art that the housing 12 may be configured otherwise without traversing the spirit of the present invention.

To assist the user in pressing the lower and upper housing members 20,38 toward each other, each of the lower and upper housing members 20,38 defines a gripping surface 30. In the illustrated embodiment, each gripping surface 30 is defined by a series of relieved areas 32 at the respective distal end 26,44 of the lower and upper housing members 20,38. It will be understood by those skilled in the art that other textured surfaces, including raised elements in lieu of relieved areas 32 may be used within the spirit of the present invention.

The first and second cutting blades 66A,66B are secured to the respective lower and upper housing members 20,38 in a conventional manner. The distal end 70A,70B of each of the first and second cutting blades 66A,66B defines a cutting edge 68A,68B configured to cooperate with the cutting edge 68B,68A of the other cutting blade 66B,66A. In the illustrated embodiment, the cutting edges 68A,68B are configured such that contact between the cutting edges 68A,68B is clearly visible to the user. This is accomplished by configuring the distal end 70A,70B of each of the cutting blades 66A,66B to define a taper or curve from the distal end 26,44 of the respective lower and upper housing members 20,38 to the respective cutting edges 68A,68B. In the illustrated embodiment, the distal end 70A,70B of each of the first and second cutting blades 66a,66B is tapered.

An illumination device 72 such as the illustrated flashlight is received between the lower and upper housing members 20,38 such that a beam of light generated thereby is directed toward the cutting blades 66A,66B. The flashlight 72 defines a proximal end 74 and a distal end 76. In the illustrated embodiment, the flashlight 72 is operated by rotating the distal end 76 relative to the proximal end 74 in order to turn the flashlight 72 ON and OFF. Because the flashlight 72 is enclosed within the housing 12 and the flashlight distal end 76 is therefore inaccessible, the housing 12 and flashlight 72 are keyed such that the distal end 76 of the flashlight 72 is fixed with respect to the housing 12. In the illustrated embodiment, the flashlight 72 defines a substantially cubicle portion 78. Each of the lower and upper housing portions 20,38 defines a recess 34,48 for closely receiving a portion of the cubicle portion 78 of the flashlight 72. The proximal end 22,40 of each of the lower and upper housing members 20,38 is configured to cooperatively define an opening 49 through which the proximal end 74 of the flashlight 72 is received. The proximal end 74 of the flashlight 72 is thus engaged and manipulated in order to selectively turn the flashlight 72 ON and OFF.

While a cubicle portion 78 defined by the flashlight 72 is illustrated and described, it will be understood that other configurations are within the spirit of the present invention. Further, it will be understood by those skilled in the art that the key between the flashlight 72 and the housing 72 may be between either one or both of the lower and upper housing members 20,38 and the flashlight 72. Further, it will be understood that for illumination devices 72 other than the type described, the housing 12 of the present invention is adapted to secure the illumination device 72 within the housing 12 while also providing an appropriate mechanism for operating the illumination device 72. For example, a flashlight 72 having either a push button activation switch or a sliding activation switch is adaptable to the present invention. Further, it is envisioned within the scope of the present invention that the illumination device 72 may be integrally formed with the housing 12.

The housing 12 further defines an illumination device receptacle 50 for receiving the distal end 76 of the illumination device 72 in such a manner as to prevent the illumination device 72 from interfering with the function of the first and second cutting blades 66A,66B. In the illustrated embodiment, the lower housing member 20 defines a receptacle 50A into which a portion of the illumination device 72 is received. Likewise, the upper housing member 38 defines a receptacle 50B into which a portion of the illumination device 72 is received. The lower and upper housing member illumination device receptacles 50A,50B are configured such that when the lower and upper housing members 20,38 are engaged to move the first and second cutting blades 66A,66B into engagement to cut a fishing line or the like, the illuminating device 72 does not interfere. It will be understood that while a particular configuration has been disclosed, other configurations may be incorporated within the present invention.

The housing 12 defines at least one receptacle for receiving selected items therein without interfering with the ergonomic features of the present invention. In the illustrated embodiment, the upper housing member 38 defines a threading device receptacle 52 and a magnet receptacle 62. The threading device receptacle 52 is provided for receiving a threading device 80 comprising a handle portion 82 and a threading wire 84, the threading wire 84 forming a loop terminating at both ends on the handle portion 82. The threading device receptacle 52 is defined by a recess in the upper surface 14 of the upper housing member 38. The recess 52 defines a bottom wall 54 and opposing side walls 56 adapted to receive the handle portion 82 of the threading device 80 therein, and below the upper surface 14 of the upper housing member 38, thereby not interfering with the ergonomic contours of the nipper housing 12. An opening 58 is defined by the upper housing member 38 between the recess bottom wall 54 and the upper surface 14 of the upper housing member 38. The opening 58 is provided for receiving the threading wire 84 of the threading device 80. To this extent, the upper housing member 38 defines a cavity 60 within for receiving the threading wire 84 without interference such that receipt of the threading wire 84 does not cause harm to the threading wire 84.

The magnet receptacle 62 is disposed at the proximal end 40 of the upper housing member 38 and is configured to closely receive a flat magnet 86. The magnet 86 is provided for temporarily carrying metallic objects such as a fish hook. To this extent, the magnet receptacle 62 is recessed between the side walls 56 of the threading device receptacle 52 such that the area in which the magnet 86 is operable is limited, thereby limiting the space in which the metallic items are held. Further, the proximal end 40 of the upper housing member 38 defines an opening 63 through which the magnet 86 is accessible. Thus, elongated objects such as fish hooks may be temporarily carried by the magnet 86 and extend through the proximal end 40 of the upper housing member 38. This configuration allows easy placement and removal of objects on and from the magnet 86.

A conventional securement device 88 is provided for securing the nipper 10 of the present invention to a selected object such as a key ring. The securement device 88 of the illustrated embodiment is a link carried by the proximal end 74 of the illumination device 72. Alternatively, the securement device 88 is carried by the housing 12 at a selected location. The securement device 88 allows the user to secure the nipper 10 of the present invention to a key chain, a tackle box handle, an article of clothing, or the like, thereby reducing the risk of losing the nipper 10. This is especially helpful when using the nipper 10 while fishing at night, when location of small objects can be difficult.

Figure 7:
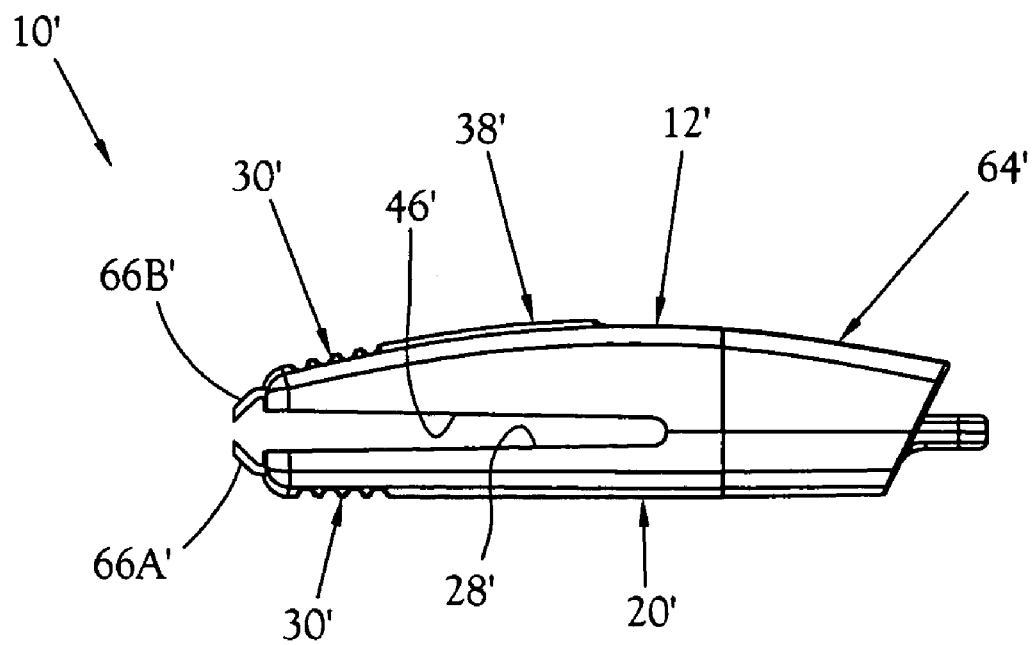
FIG. 7 is a side elevation view of an alternate embodiment of a fisherman's nipper of the present invention wherein no illumination device is provided.
Figure 8:
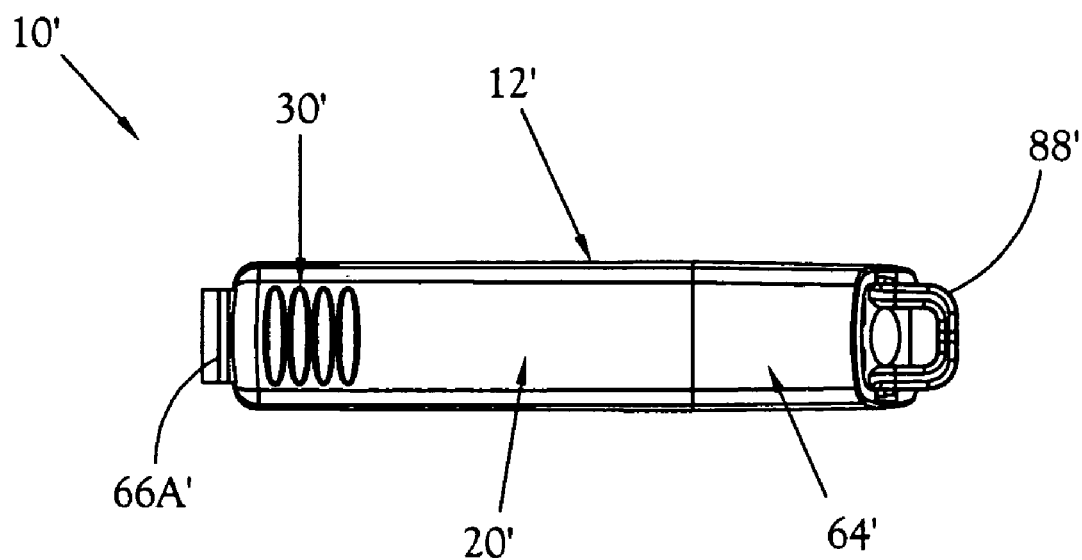
FIG. 8 is a bottom plan view of the fisherman's nipper of FIG. 7.

An alternate embodiment of the nipper 10' of the present invention is illustrated in FIGS. 7–8. This embodiment is substantially similar to the previously described embodiment, with the exception that there is no illumination device 72 provided. Accordingly, the housing 12 features of the previously described embodiment which are provided for accommodating the illumination device 72 are not necessary to the alternate embodiment. Like elements are labeled with like numbers, with a "'" designation added for continuity between the embodiments. FIG. 7 illustrates a side elevation view. In this embodiment, the securement device 88' is integrally formed with the lower housing member 20'. This is more clearly seen in FIG. 8.

From the foregoing description, it will be recognized by those skilled in the art that a device for use by fishermen to perform several functions including assisting in preparing a hook on a fishing line has been provided. The device of the present invention is a nipper provided primarily for assisting in cutting a fishing line. The nipper is provided with a light for illuminating the fishing line when fishing in the dark, a receptacle for receiving a threading device, and a magnet for holding metallic objects such as a hook. Further, the nipper of the present invention is provided with means for securing the nipper to a selected object for easy location.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A device for assisting a fisherman in preparing a hook on a fishing line, said device comprising:
a housing including:
a lower housing member defining a proximal end and a distal end, said distal end forming a lower jaw;
an upper housing member defining a proximal end and a distal end, said distal end forming an upper jaw; and
a retainer for retaining said lower and upper housing members in a fixed relationship a nipper carried by said housing for assisting in cutting a fishing line, said nipper including a first cutting blade and a second cutting blade, said lower housing member lower jaw being adapted to carry said first cutting blade, and said upper housing member upper jaw being adapted to carry said second cutting blade, a distal end of said first cutting blade defining a cutting edge configured to cooperate with a cutting edge defined by a distal end of said second cutting blade; and
an illumination device carried within said housing and oriented such that a beam of light from said illumination device is directed toward said nipper for selectively illuminating the fishing line.

2. The device of claim 1 wherein said illumination device defines a proximal end and a distal end, said illumination device being operated by rotating said proximal end relative to said distal end, said housing being adapted to receive said illumination device such that said distal end of said illumination device is fixed relative to said housing, said housing defining an opening through which said proximal end of said illumination device is received, thereby enabling operation of said illumination device.

3. The device of claim 2 wherein said housing further defines an illumination device receptacle for receiving said distal end of said illumination device in such a manner as to prevent said illumination device from interfering with said first and second cutting blades.

4. The device of claim 1 wherein each of said lower housing member distal end and said upper housing member distal end defines a gripping surface to enable closure of said device.

5. The device of claim 1 wherein said upper housing member defines a threading device receptacle adapted to receive a threading device including a handle portion and a threading wire, said threading device receptacle being defined by a recess in said upper housing member, said recess being adapted to receive said handle portion of said threading device therein, said upper housing member defining an opening in said recess for receiving said threading wire.

6. The device of claim 1 wherein said upper housing member defines a magnet receptacle adapted to receive a magnet, said magnet being provided for selectively retaining metallic objects.

7. The device of claim 1 further comprising a securement device adapted to secure said device to a selected object to prevent loss of said device.

8. A device for assisting a fisherman in preparing a hook on a fishing line, said device comprising:
a housing, said housing defining at least one receptacle adapted to receive at least one selected article for use in preparing a hook on a fishing line, said housing including:
a lower housing member defining a proximal end and a distal end, said distal end forming a lower jaw;
an upper housing member defining a proximal end and a distal end, said distal end forming an upper jaw; and
a retainer for retaining said lower and upper housing members in a fixed relationship; and
a nipper carried by said housing for assisting in cutting a fishing line, said nipper including a first cutting blade and a second cutting blade, said lower housing member lower jaw being adapted to carry said first cutting blade, and said the upper housing member upper jaw being adapted to carry said second cutting blade, a distal end of said first cutting blade defining a cutting edge configured to cooperate with a cutting edge defined by a distal end of said second cutting blade.

9. The device of claim 8 wherein each of said lower housing member distal end and said upper housing member distal end defines a gripping surface to enable closure of said device.

10. The device of claim 8 wherein said at least one receptacle includes a threading device receptacle defined by said upper housing member and adapted to receive a threading device including a handle portion and a threading wire, said threading device receptacle being defined by a recess in said upper housing member, said recess being adapted to receive said handle portion of said threading device therein, said upper housing member defining an opening in said recess for receiving said threading wire.

11. The device of claim 8 wherein said at least one receptacle includes a magnet receptacle defined by said upper housing member and adapted to receive a magnet, said magnet being provided for selectively retaining metallic objects.

12. The device of claim 8 further comprising a securement device adapted to secure said device to a selected object to prevent loss of said device.

* * * * *